United States Patent [19]

Eidorff

[11] 4,386,851
[45] Jun. 7, 1983

[54] INSTRUMENT FOR MEASURING OR MARKING OUT DISTANCES FROM A LINE OR A PLANE

[76] Inventor: Stig K. Eidorff, No. 2 A Engstien, Dragør, Denmark, 2791

[21] Appl. No.: 183,744

[22] Filed: Sep. 3, 1980

[30] Foreign Application Priority Data

Sep. 17, 1979 [DK] Denmark .............................. 3867/79

[51] Int. Cl.$^3$ .............................................. G02B 27/32
[52] U.S. Cl. .................................... 356/254; 356/255; 356/401
[58] Field of Search ................................. 356/247–250, 356/252, 254, 255, 143, 148, 399, 401; 33/290–292; 350/173

[56] References Cited

U.S. PATENT DOCUMENTS

| | | | |
|---|---|---|---|
| 921,773 | 5/1909 | Wild | 356/249 |
| 3,296,444 | 1/1967 | Wilson | 250/203 |
| 3,580,687 | 5/1971 | Hansen | 356/255 X |
| 3,603,687 | 9/1971 | Hock | 356/153 |
| 4,045,141 | 8/1977 | Moriyama et al. | 356/401 X |

FOREIGN PATENT DOCUMENTS

| | | | |
|---|---|---|---|
| 1002564 | 10/1951 | France | . |
| 1358363 | 3/1964 | France | 350/173 |
| 178139 | 1/1966 | U.S.S.R. | . |

OTHER PUBLICATIONS

Bohlin, "Simultaneous Optical Monitoring of Angular and Translational Alignment", *Applied Optics*, vol. 11, No. 4, pp. 961-962, Apr. 1972.

*Primary Examiner*—John K. Corbin
*Assistant Examiner*—Matthew W. Koren
*Attorney, Agent, or Firm*—Burns, Doane, Swecker & Mathis

[57] ABSTRACT

Instrument for measuring the distances of points from a plane or a straight line defined by means of the instrument. The instrument may also be used in marking output points from a plane or a straight line.

The instrument functions by forming at least two mirror images of a measuring object in such a manner that these images are differently oriented when viewed. This is accomplished in the simplest embodiment of the instrument by a prism whose front face is semi-reflecting whereas the other faces are perpendicular to each other and totally reflecting. If the measuring object is not on the defined plane or line this will show up as a displacement of the differently oriented mirror images in relation to each other.

The substantial novelty of the instrument is that all the images the relative displacement of which are employed for the read-out are mirror images of the measuring object and are formed without the need for focussing optical components such as lenses and concave mirrors.

10 Claims, 10 Drawing Figures

INSTRUMENT FOR MEASURING OR MARKING OUT DISTANCES FROM A LINE OR A PLANE

FIELD OF THE INVENTION

The invention relates to an instrument for measuring the distances of points from a plane or a straight line defined by the instrument. The instrument is also applicable to marking out points from a plane or a straight line.

BACKGROUND OF THE INVENTION

Work of this character is common in the field and on construction sites in connection with surveying, construction work, and building of houses and ships. Similar tasks are common in connection with erection and adjusting of machines and measuring apparatus, so called optical tooling.

For such tasks it is now most common to employ instruments based on a sighting telescope and a movable object, for instance a levelling staff, or some other measuring object having a clearly visible pattern.

In operating on greater distances it is, however, for practical reasons necessary that two persons are involved, viz. one person at the sighting instrument, and one other person moving the measuring object around. If all operations, including the read-out, can be performed from the position of the measuring object one person would be able to perform both read-out and moving the measuring object, and the work would therefore become considerably more effective.

In high precision optical tooling the inevitable heat and vibration originating from the operator would disturb the precise aligning of the telescope instrument. It would therefore be an advantage to have the operator physically separated from the instrument, the position of which defines the desired plane or line.

The employment of light beams from gas lasers emitted in a given direction or in a given plane is also known, but in view of the dangers pertaining to laser light and the practical difficulties encountered, inter alia in the current supply to lasers, it would be advantageous to be able to obviate these components.

Instruments operating by means of image pairs having oppositely oriented components are known from the British Pat. Nos. 684,292 and 1,235,664. Their function relies on oppositely oriented images of a measuring object being displaced in each its direction by a unilateral displacement of the measuring object from a given plane or line. This relative displacement of the images is observed by an eye, possibly enlarged by means of a telescope or the like.

In instruments according to the first mentioned patent an image pair is formed by semi-transparent mirrors located in both focal planes of a lens or in a focal plane of a concave mirror. The formation of the image pair is in other words dependent on a depiction by a focussing system which means that the images in the case of large measuring distances must be highly reduced relative to the measuring object in order to obtain reasonable dimensions of the optical system. This is very disadvantageous with a view to the faithfulness of the instrument.

British Pat. No. 1,235,664 describes an instrument which by means of reflections in plane surfaces forms a vertically inverted image in natural size of the measuring object. On regarding this image together with the direct sight through the instrument the same effect is obtained as by an image pair having oppositely oriented components and an exactitude corresponding to work with a sighting telescope. An instrument according to that specification is, however, to be employed in the same manner and with principally the same lay-out as the sighting telescope, since the measuring object is to be viewed through the instrument so that the measuring operation cannot be performed by a person on the position of the measuring object.

OBJECT OF THE INVENTION

An object of this invention is to provide instruments for the measuring and marking out operations which during the measuring operations can be handled by one person on the location of the measuring object and do not need another person for handling the outfit which defines the desired direction or the desired plane and which operates without the use of laser light.

BRIEF SUMMARY OF THE INVENTION

This object and others are obtained according to the invention by means of instruments that create at least two differently oriented images of a measuring object characterised in that the optic system is designed in such a manner that all the oppositely oriented images which are used for the measuring process are mirror images of the measuring objects, and in that all reflecting or refracting surfaces necessary for the formation of the said mirror images are plane or curved in such a manner that the combined reflecting or refracting systems have a so small combined optic power that substantially the same effect is obtained as if all the surfaces were planar.

The invention may be performed in many different ways as exemplified below, but all embodiments have the common feature that there are formed in the instrument by planar reflecting surfaces at least two mirror images of a measuring object in such a manner that one of the images is oriented oppositely to another in one or several directions. When the images are regarded by an eye, possibly with optic aids for enlarging the images, a displacement in opposite directions of two differently oriented images will indicate a deviation of the measuring object from the plane or the straight line defined by the placing of the instrument.

An important feature of the invention is that the differently oriented images which are regarded in the measuring process are mirror images of the measuring object so that this latter may be located on the place of the observer while at the same time focussing optic systems such as lenses or concave mirrors for the creation of these mirror images are not required, so that the images will always be in full scale.

In lieu of a visual observation of the image pairs their relative displacement can be detected electro-optically as described below.

In some cases it may be advantageous in lieu of wholly planar surfaces to use curved surfaces. If the curvature is very small or if the optical power of a plurality of curved surfaces cancels out totally or partly, substantially the same effect will be obtained as if all the surfaces were planar.

BRIEF DESCRIPTION OF THE DRAWINGS

The invention is explained in various embodiments in more detail in the following with reference to the drawings.

DESCRIPTION OF THE PREFERRED EMBODIMENTS

Figure 1:
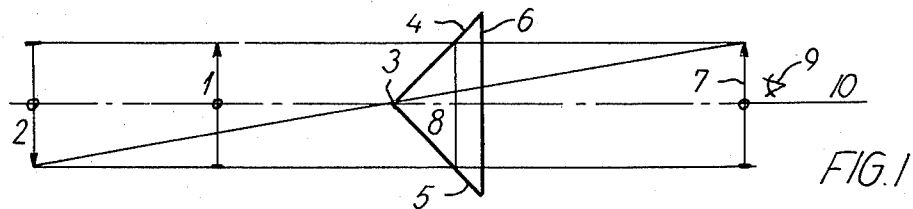
FIGS. 1 and 2 are schematic views of a first comprising only a prism having a semi-transparent front face.

With reference to FIG. 1, a right-angled prism 8 includes an edge 3 having the right angle and being perpendicular to the plane of the paper. The faces 4, 5 and 6 are likewise perpendicular to the plane of the paper. According to known optical theory the faces 4 and 5 are reflecting for light rays entering substantially perpendicular to the face 6 so that the combined reflection in the faces 4 and 5 corresponds to a reflection about the line 3.

If the face 6 is provided with a layer which makes this face partly transparent and partly reflecting this prism will create two mirror images which are oppositely oriented. Thus, a measuring object 7 will be mirrored about the line 3 into the mirror image 2 and in the face 6 into the mirror image 1.

Figure 2:
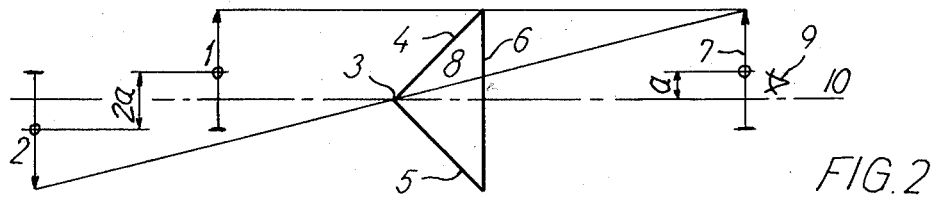

If the centre of the measuring object 7 is displaced a distance a out of the plane 10 in the direction of the arrow head of the arrow 7, the mirror images 1 and 2 will be displaced the same distance a in either direction as shown in FIG. 2. This relative displacement of the images will be observable by an eye 9 in the vicinity of the measuring object and will thus indicate that the centre of the measuring object is outside the plane 10.

Reading the instrument may be performed through making the measuring object as a measuring stick so that the relative displacement of the oppositely oriented images may be directly read out. A practically more exact manner is to displace the measuring object back to its original location so that the two images coincide. This displacement to make the images coincide is measured directly by means of a scale or the like on the sighting instrument.

The plane 10 which is thus defined by the prism is determined by the conditions that it must be perpendicular to the face 6 and contain the line 3.

A modification of the instrument is obtained by using a trihedral prism in lieu of the right angled prism. Such a trihedral prism functions according to known optical theory in such a manner than an object placed before the prism in the vicinity of the axis thereof is reflected about the apex of the prism.

In FIGS. 1 and 2 the prism as shown is supposed to be such a trihedral prism with the point 3 as its apex. The mirror image 1 is as before a reflection in the face 6, whereas the image 2 is now a reflection about the point 3 and is therefore oppositely oriented as against the image 1 not only in the plane of the figure but also perpendicular thereto in the plane 10. A relative displacement of the two images is now produced not only by a displacement of the measuring object 7 in the plane of the figure but also by displacement in the plane 10. This instrument defines in other words a straight line through point 3 and perpendicular to 6.

In order to improve the measuring exactitude, the image pairs 1 and 2 may be viewed through a telescope, a microscope etc. and in order to create convenient working positions a light path from the image pair to the eye may be bent or folded by means of prisms and mirrors.

These extra components may advantageously be combined into a unit. Thus, the instrument will comprise two separate parts, viz. the definition part which contains those components which form the differently oriented mirror images and thus fixes the defined line or plane, and the viewing part which contains the measuring object etc. and the components which make it possible for the eye of the operator to see the differently oriented mirror images in a convenient direction and with a suitable enlargement.

In the case of work over larger distances it will be desirable that the entire optic system is coaxial in order that the components shall not become too large.

Figure 3:
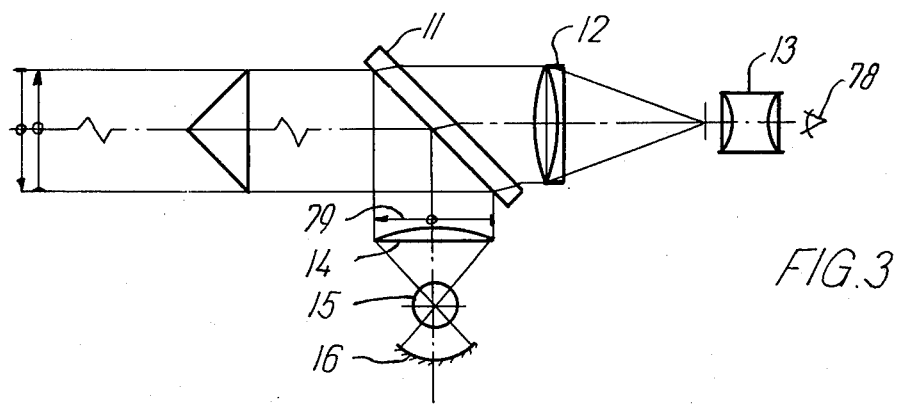
FIG. 3 is a schematic view of a second embodiment in which the measuring object is transparent and transilluminated by a system comprising an incandescent lamp and a reflector.

An example of such an arrangement is shown in FIG. 3 in which 11 denotes a semi-transparent mirror, 12 and 13 denote objective and ocular, resp. of a telescope through which the eye 78 is viewing the image pairs. 79 designates the measuring object which ordinarily consists of a pattern of parallel lines and lines perpendicular thereto. A conventional illuminating system comprising an incandescent lamp 15 and concave mirror 16 and a condenser lens 14 is added in order to increase the luminance of the line pattern.

Figure 4:
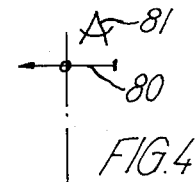
FIG. 4 is a schematic view of an embodiment arranged as an optical plumb line.

FIG. 4 shows another modification of the invention which is here used as an optic plumb line. 17 denotes a vial having a mercury surface and an optical aperture at the top. The mercury surface is reflecting and forms an image corresponding to image 1 in FIG. 1. A composite prism 18 is assembled along a semi-transparent diagonal face, whereas a trihedral prism 19 forms an image corresponding to image 2 in FIG. 1. A measuring object 80 and a viewing system 81 are also provided. This instrument defines a plumb line passing through the apex of the mirror image of the prism 19 in the diagonal surface of 18. In lieu of a mercury surface a planar mirror may be employed suspended in such a manner that it is horizontal by gravity.

Figure 5:
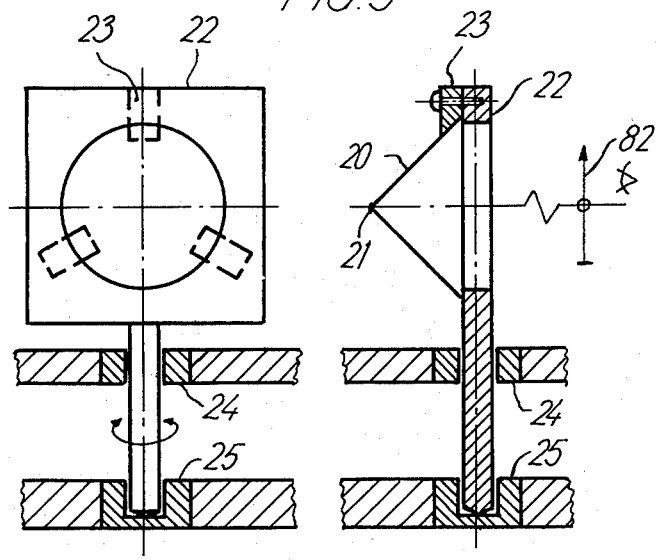
FIG. 5 is a schematic view of an embodiment for defining a plane omnidirectionally about the instrument.

In order to define a plane omnidirectionally around the prism the modification of the invention as shown in FIG. 1 having a trihedral prism could be employed with the prism mounted rotatably about an axis perpendicular to the plane to be defined. This modification is shown in FIG. 5 and includes a prism 20 having an apex 21. The prism is secured to a disc 22 by means of lugs 23. This disc 22 is at the bottom made as a shaft which is pivotally mounted in journals 24 and 25. The prism which at any moment defines a line through 21 perpendicular to the foremost semi-transparent surface will upon rotation describe a plane perpendicular to the axis of rotation if the prism is mounted in such a way that the semi-transparent surface is parallel to the axis of rotation.

In order for this embodiment of the invention to enable the measuring work to be performed by one person at the position of the measuring object, the rotation of the prism must be continuous or be controllable from the said position. This can be accomplished, for instance by performing the rotation by an electromotor capable of being started and stopped by signals from the position of the measuring object.

When working over large distances the start and stop of the rotation becomes very critical, since the mirror image produced by the semi-transparent surface is only visible in a small zone around the defined line. This problem may be solved by the modification of the invention shown in FIG. 6.

Figure 6:
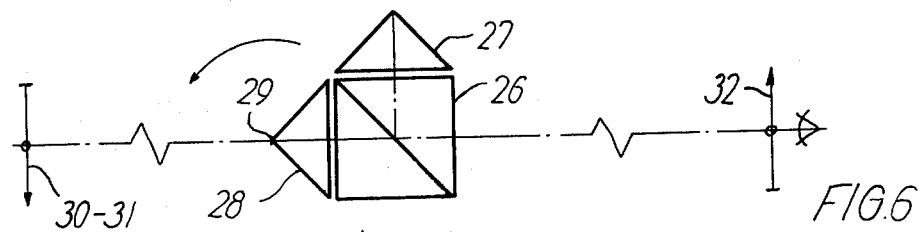
FIG. 6 is a schematic view of a more sophisticated embodiment than the system of FIG. 5 in which the two images are visible in a larger angle and in which the system may be performed as an automatically horizontating levelling instrument.

In FIG. 6 the plane of the figure is the defined plane. The three prisms are secured in relation to each other and can be rotated as a unit about an axis perpendicular to the plane of the figure. A composite cemented prism 26 has a semi-transparent diagonal surface. A trihedral prism 27 is provided without a semi-transparent coating on the front face whereas 28 is a right-angled prism 28 is arranged so that the edge 29 having the right angle is perpendicular to the plane of the figure. Through this arrangement a plane perpendicular to the edge 29 and going through the apex of the mirror image of the prism 27 in the diagonal plane of the prism 26 is momentarily defined. This follows from the fact that the mirror image 30 about the line 29 in a direction perpendicular to the plane of the figure becomes oppositely directed relative to the mirror image 31 about the apex of the prism 27. The two mirror images 30 and 31 are however both oppositely oriented in the plane of the figure as against the measuring object 32 and they are therefore visible from 32 even at comparatively large rotations of the prism unit.

If the rotational axis of the prism unit of FIG. 6 is substantially vertical and the prism 28 is supported in such a manner that the edge 29 owing to the influence of gravity is maintained vertical the instrument becomes an automatically horizontally levelling instrument, the defined plane being according to the above explanation perpendicular to the edge 29.

Figure 7:
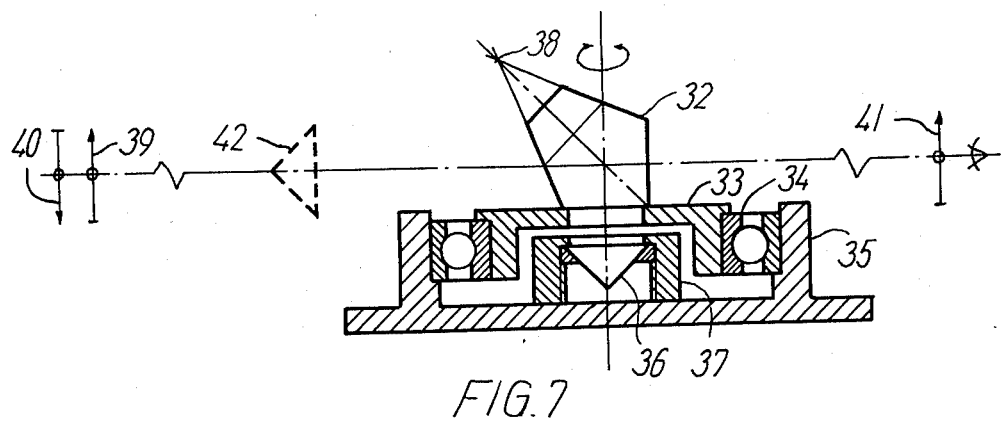
FIG. 7 is a view of an embodiment for defining a plane more exactly than the mechanical pivot guide for the optical components.

If a plane is to be defined with great exactitude and it is not to be horizontal so that the above mentioned automatically horizontally levelling embodiment could be used, a modification of the invention as shown in FIG. 7 may be employed.

In FIG. 7, a pentaprism 32 has 45° between the two reflecting faces. This prism is mounted fixedly on a disc 33 which by means of a journal 34 is rotatable in relation to a socket 35. A trihedral prism 36 has a semi-transparent coating on the front face. This prism is secured to a socket 37 which is in fixed connection with the socket 35. According to known optic theory the prism 32 forms a mirror image of the prism 36 the position of which image can be found by turning the prism 36 90° about the intersecting line 38 of the two reflecting surfaces. This mirror image 42 is shown in broken lines in the figure and it forms itself the mirror images 39 and 40 of the measuring object 41 in the usual manner. The function of this instrument corresponds entirely to the function of the instrument shown in FIG. 5, but the error in the rotational guidance of the defined line is only a second order error of the error of the mechanical pivotal guide, whereas the error in the instrument according to FIG. 5 is of the first order of the mechanical error.

When working on large distances the instrument shown in FIG. 7 has the same disadvantage as the instrument of FIG. 5, viz. that the orientation towards the measuring object must be adjusted very precisely in order for the mirror image 39 to be seen therefrom. The solution of this problem is as shown in FIG. 6, viz. that the two mirror images must both be oriented oppositely to the measuring object in the defined plane.

Figure 8:
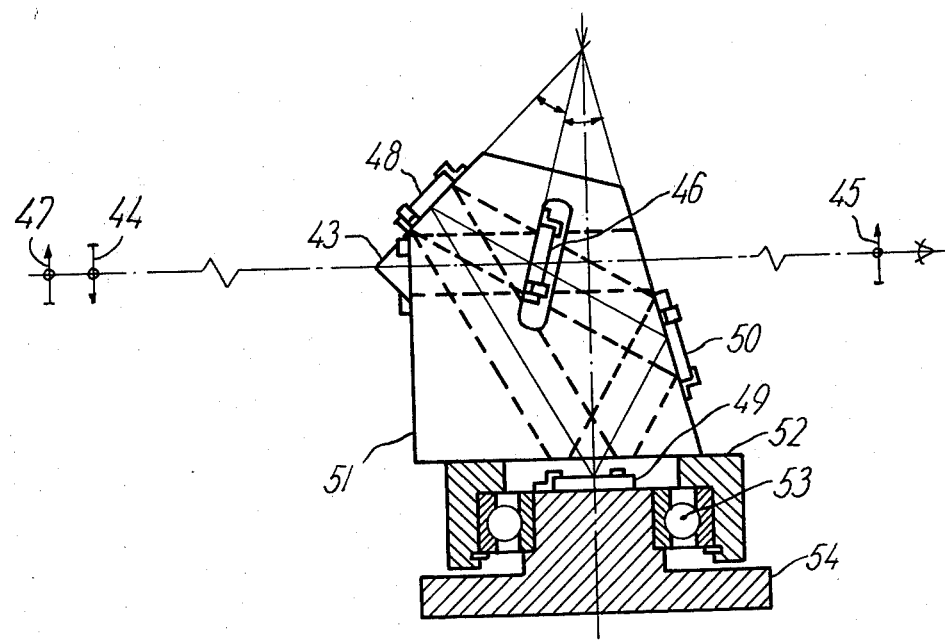
FIG. 8 is a schematic view of an embodiment of the system of FIG. 7 having a larger angle of field.

A modification of the invention which performs these reflections and thus combines the advantages of the instruments shown in FIG. 7 and in FIG. 6 is shown in FIG. 8.

In FIG. 8, a trihedral prism 43 without a semi-transparent front face forms a mirror image 44 of the measuring object 45 by a part of the light from the object 45 passing through a semi-transparent mirror 46 both before and after reflection.

The oppositely directed component 47 in the pair of mirror images is formed by mirroring the light from the object 45 in the mirror 46 either before or after the reflection in the prism 43 and is therefore guided around the system of mirrors 46-48-49-50-46. A stationary mirror 49 is provided the normal of which becomes a normal to the defined plane corresponding to the semi-transparent front face of the prism 36 in the instrument shown in FIG. 7. The prism 43 and the mirrors 48, 46 and 50 are fixedly mounted on a ring 52 which by means of a journal 53 is rotatable in relation to a foot piece 54.

It can be shown mathematically that if the angle between the mirrors 46 and 48 is equal to the angle between the mirrors 46 and 50 the resulting reflection in 43-46-48-49-50-46 is equivalent to a reflection in a right-angled prism arranged with the edge having the right angle perpendicular to the stationary mirror 49. The mirror images are therefore located as in the instrument shown in FIG. 6, but the directional errors in the defined plane are substantially smaller than the directional errors in the rotational guidance of the mirror system.

In most of the illustrated embodiments of the invention the two oppositely directed mirror images are not located at the same distance from the measuring object. Parallax errors in the read-out of the relative displacement may therefore arise in particular when working on short distances. By the addition of further optical components it is in the majority of cases possible to obtain that the two mirror images are located at the same distance, see for instance FIG. 9, in which the embodiment having a trihedral prism with semi-transparent front page has been supplemented in this manner. A trihedral prism 55 without a semi-transparent front face, has an effective apex 56 around which the reflection takes place. A composite cemented prism 57 has a semi-transparent diagonal face whereas a plane mirror 58 is located in such a manner that it is mirrored in through the apex 56 in the diagonal face of the prism 57. The reflection in the plane face and in the apex 56 will now take place in the same optical distance from the measuring object and the mirror images will accordingly be located in the same distance therefrom.

Figure 10:
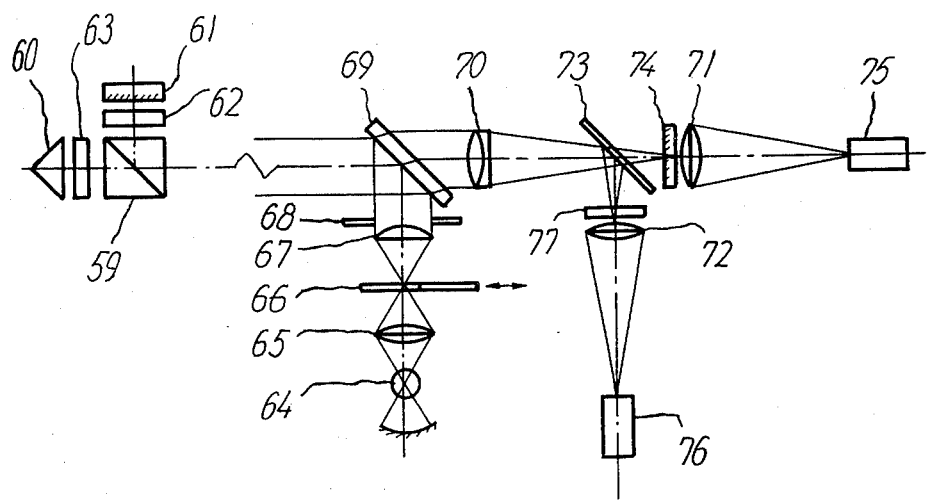

In lieu of regarding the relative displacement of the differently oriented mirror images by eye the displacement may be read out by means of e.g. an electro-optical system which may be built as shown in FIG. 10. The system distinguishes itself by the fact that mirror images having different orientations are presented successively to the photodetectors which create the possibility of high sensitivity and high noise-suppression.

Figure 9:
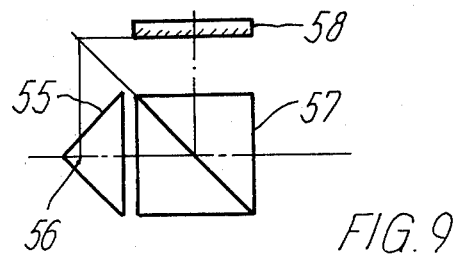
FIG. 9 is a schematic view of an embodiment in which the oppositely oriented images are lying exactly in the same plane and, FIG. 10 is a schematic view of an embodiment having electro-optical read-out.

The double images are formed by the prism system 59-60-61 in the same manner as in the system of FIG. 9 but filters 62 and 63 inserted into the light paths cause the images formed in 60 and 61, resp., to consist of different frequency ranges of the radiation spectrum issued by the lamp 64.

The lens 65 focusses the image of the filaments of the lamp on a bipartite filter 66, the halves of which are transparent for the same frequencies as the filters 62 and 63. The bipartite filter is vibrated to and fro in the direction indicated by a double arrow so that the light transmitted from the lamp belongs alternately to one and the other frequency range. The transmitted light is collimated by the lens 67 and illuminates the transparent measuring object 68 which in this case may be only a diaphragm so that as much light as possible is directed towards the prism system 59-60-61 via the semi-transparent mirror 69.

The objective 70 forms an image of the mirror images formed by 59-60-61 on the lenses 71 and 72 via the semi-transparent mirror 73. The element 74 is transparent with a coating the transparency of which varies uniformly from 0 in one end to approximately 1 in the other end so that the transmitted part of the light to the image on 71 is dependent on the position of the image. 71 and 72 provide an image of 70 on photodetectors 75 and 76, resp. which deliver electric currents $i_1$ and $i_2$, resp., in proportion to the received radiation effect. A filter 77 is adapted in such a manner that a relation between the spectral sensitivity of the two photodetectors is the same for the two frequency ranges employed.

On forming a voltage e proportional to the relation $i_1/i_2$, e.g. in an analog electronic circuit, the magnitude of this voltage is a direct measure of the position of the mirror image of 68 the filter 62 or 63 of which corresponds to that part of the bipartite filter 66 which momentarily is inserted into the light path. If the two images are displaced relatively this will assert itself by the fact that e contains an alternate voltage component with the same frequency and phase as the vibration of the bipartite filter 66.

In lieu of the filters 62, 63 and 66 having different transparency for different frequencies they may have different transparency for different directions of polarization or at different moments. In the last mentioned case the filters may consist e.g. of controlled shutters or choppers, and the vibrated filter 66 may be dispensed with since the momentary selection of images having different orientation is performed directly by the filters.

In lieu of filters having different or varying transparency filters may be employed which function due to their different or varying reflectance.

The modifications of the invention shown in FIGS. 4 and 6 may be supplemented in such a manner that the reflections which take place in faces perpendicular to or parallel with a vertical line are in fact created by a plurality of successive reflections in faces which have only a fixed angle in relation to the vertical line. It may inter alia give constructional advantages.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. Instrument for measuring or marking out the distance of a point from a basic plane or line comprising:
    a definition sub-unit including at least two and at the most three mutually perpendicular planar reflecting mirror surfaces enclosing between them an angle bisectrix defining said basic plane or line, and a planar semitransparent mirror surface facing said reflecting mirror surfaces and intersecting said bisectrix,
    an object sub-unit including a visual object adapted to be held in a predetermined relation to said point,
    a viewing sub-unit arranged to observe through the intermediary of said definition sub-unit a pair of oppositely oriented mirror images of said visual object and to register their relative position as a measure of said distance, and
    said object sub-unit being optically arranged between the definition sub-unit and the viewing sub-unit.

2. Instrument as claimed in claim 1, wherein said semitransparent mirror surface of said definition sub-unit intersects and is perpendicular to said bisectrix.

3. Instrument as claimed in claim 1, wherein said semitransparent mirror of said definition sub-unit intersects and forms an angle of 45° with said bisectrix.

4. Instrument as claimed in claim 3, wherein said bisectrix of said definition sub-unit is perpendicular to said basic plane or line, and wherein the mirror images of said visual object are viewed via at least one reflecting surface in said definition under deflecting the line of sight of said viewing sub-unit through an angle of 90°.

5. Instrument as claimed in claim 1, wherein said semitransparent mirror surface of said definition sub-unit includes an obtuse angle with said bisectrix, and further comprising
    a second pair of reflecting mirror surfaces being provided one on either side of said bisectrix including equal angles with the plane of said semitransparent mirror surface,
    a third reflecting mirror surface being provided parallel to said bisectrix and facing said second pair of reflecting surfaces so as to reflect light rays received from one of the second pair of reflecting surfaces onto the other,
    an assembly comprising said mutually perpendicular reflecting surfaces, said second pair of reflecting surfaces, and said semitransparent mirror surface being pivotal as a whole about an axis perpendicular to and intersecting said third mirror surface.

6. Instrument as claimed in claim 1, wherein at least a portion of an optical axis of said viewing sub-unit is parallel to said basic plane or line,
    an optical axis of said object sub-unit being perpendicular to said basic plane or line, and
    a semitransparent mirror being provided at the intersection of said axes bisecting the angle between them.

7. Instrument as claimed in claim 1, wherein said object sub-unit and said viewing sub-unit are united into an assembly, whereas said definition sub-unit is a separate unit.

8. Instrument as claimed in claim 1, further comprising filters having different transmittance inserted in the light paths from said object sub-unit via said definition sub-unit to said viewing sub-unit, said filters being provided in sections of the light paths specific for each orientation of said mirror images so that differently oriented images are composed of light having different frequency bands, said viewing sub-unit comprising two receptors sensitive to a respective frequency band.

9. Instrument as claimed in claim 1, further comprising filters having different reflectance inserted in the light paths from said object sub-unit via said definition sub-unit to said viewing sub-unit, said filters being provided in sections of the light paths specific for each orientation of said mirror images, so that differently oriented images are composed of light having different polarization, said viewing sub-unit comprising two receptors sensitive to a respective polarization.

10. Instrument as claimed in claim 1, further comprising periodically operated shutters having the same periodicity but different phases inserted in the light paths from said object sub-unit via said definition sub-unit to said viewing sub-unit, said shutters being provided in sections of the light paths specific for each orientation of said mirror images, so that differently oriented images are composed of light pulses being displaced in time from each other, said viewing sub-unit comprising two sensors registering the phase difference between said pulses.

* * * * *